United States Patent

Chavez et al.

[11] Patent Number: 5,094,604
[45] Date of Patent: Mar. 10, 1992

[54] APPARATUS FOR MAKING GRANULAR ABSORBENT FROM FIBROUS MATERIALS

[75] Inventors: Domingo Chavez, Racine, Wis.;
Loukia Papadopoulos, Chicago, Ill.;
Jennifer A. Stein, Evanston, Ill.;
Rudolph C. Valenta, Buffalo Grove, Ill.

[73] Assignee: Oil-Dri Corporation of America, Chicago, Ill.

[21] Appl. No.: 630,021

[22] Filed: Dec. 19, 1990

[51] Int. Cl.⁵ .................. B29C 67/02; B29C 67/06
[52] U.S. Cl. ............................. 425/222; 23/313 R; 264/117; 425/205; 425/209
[58] Field of Search ............ 425/222, DIG. 101, 332, 425/200, 209, 205; 264/117, 313 R; 23/314

[56] References Cited

U.S. PATENT DOCUMENTS

| | | | |
|---|---|---|---|
| 3,900,547 | 8/1975 | Hunt et al. | 425/222 |
| 4,010,001 | 3/1977 | Pollinger | 425/222 |
| 4,123,226 | 10/1978 | Vanderveen | 425/222 |
| 4,162,286 | 7/1979 | Gounnell et al. | 264/117 |
| 4,290,988 | 9/1981 | Nopper et al. | 264/118 |

*Primary Examiner*—Jay H. Woo
*Assistant Examiner*—Khanh P. Nguyen
*Attorney, Agent, or Firm*—Dressler, Goldsmith, Shore, Sutker & Milnamow, Ltd.

[57] ABSTRACT

An apparatus suitable for making a granular absorbent from cellulosic fibrous material includes a housing which defines an elongated internal cavity, and an inlet and an outlet communicating with the internal cavity. A rotatably driven shaft extends within the cavity of the housing, with the apparatus including an impeller arrangement mounted on the shaft for rotation therewith. The impeller arrangement includes resiliently flexible bristles which cooperate with the interior surface of the internal cavity for effecting agitation, blending, and agglomeration of the cellulosic fibrous feed stock. A pellet-like granular absorbent is produced.

16 Claims, 2 Drawing Sheets 5,094,604

APPARATUS FOR MAKING GRANULAR ABSORBENT FROM FIBROUS MATERIALS

TECHNICAL FIELD

The present invention relates generally to manufacture of granular, absorbent material, and more particularly to an apparatus for making a granular absorbent by agglomerating cellulosic fibrous material, with the apparatus including a rotary agitator having arrays of resiliently flexible bristles.

BACKGROUND OF THE INVENTION

Granular absorbent materials are particularly well suited to certain commercial and residential applications. For commercial use, such granular materials, typically comprising clay fines or the like, are uniquely suited for absorbing oil, grease, and other lubricants and liquids which are difficult to clean in a conventional fashion. This type of granular absorbent material is also particularly well suited for residential use such as for animal litter boxes and the like.

While naturally-occurring clay fines can be principally employed in formulating a granular absorbent, use of another absorbent material in combination with the clay can be desirable for enhanced performance and economical use. To this end, the present invention contemplates an apparatus which is configured to facilitate mechanical mixing, agitation, and agglomeration of cellulosic fibrous material, such as waste paper and the like, for making a granular absorbent. Such granular absorbents are also well suited for use as carriers for agricultural chemicals.

SUMMARY OF THE INVENTION

The present apparatus for making a granular absorbent permits a granular absorbent to be formed at least partially from cellulosic fibrous material. This is achieved by configuring the apparatus to include an impeller arrangement which includes a plurality of rotatable arrays of resiliently flexible bristles. The arrays of bristles provide a combined agitation and granulation action which facilitates the efficient agglomeration and formation of absorbent granules from a paste slurry containing the cellulosic fibrous material. After discharge from the apparatus, the granular absorbent is dried and stored for use.

In accordance with the illustrated embodiments, the present apparatus includes an elongated housing which defines an internal cavity having an arcuate, concave surface complementary to the arc traced by rotating bristle arrays. Preferably the cavity is cylindrical. The housing further defines an inlet which communicates with the internal cavity for receiving cellulosic fibrous material (as well as any other compound from which the granular absorbent is formulated) and an outlet for discharge of a produced granular absorbent.

A rotatable shaft carries the bristle arrays and extends within the internal cavity of the apparatus housing and is journaled for rotation about a longitudinal axis of the defined internal cavity. It is presently preferred that the interior surface of the internal cavity be suitably roughened or textured, such as by lining the cavity with a screen, to enhance the desired agglomeration of the cellulosic material.

The apparatus further includes a drive arrangement for rotatably driving the shaft within the internal cavity. The drive may include a suitable electric motor or the like.

In accordance with the present invention, a flexible impeller means is provided as part of an arrangement mounted on the rotatably driven shaft for rotation therewith. The impeller or impellers extend away from the axis about which the shaft rotates and cooperate with an arcuate surface that defines at least part of the internal cavity of the apparatus housing to effect agitation and substantially concurrent granulation of the cellulosic fibrous material.

The desired degree of agitation, blending, and agglomeration of the cellulosic fibrous material is achieved by configuring the flexible impeller arrangement to include at least one, and preferably a plurality, of arrays of resiliently flexible bristles, which arrays may be provided in a brush-like form. In order to convey material to the bristles, one or more rigid elements are provided on the rotatable shaft upstream of the arrays of bristles. The rigid elements desirably act to convey and advance the cellulosic fibrous feed material from the inlet of the apparatus toward the arrays of bristles, and further act to agitate and blend the fibrous material. In one of the illustrated embodiments, the rigid conveyor elements comprise a plurality of paddle-like members, while in the alternate embodiment a rigid auger is provided.

Other features and advantages of the present invention will become readily apparent from the following detailed description, the accompanying drawings, and the appended claims.

DETAILED DESCRIPTION

Figure 1:
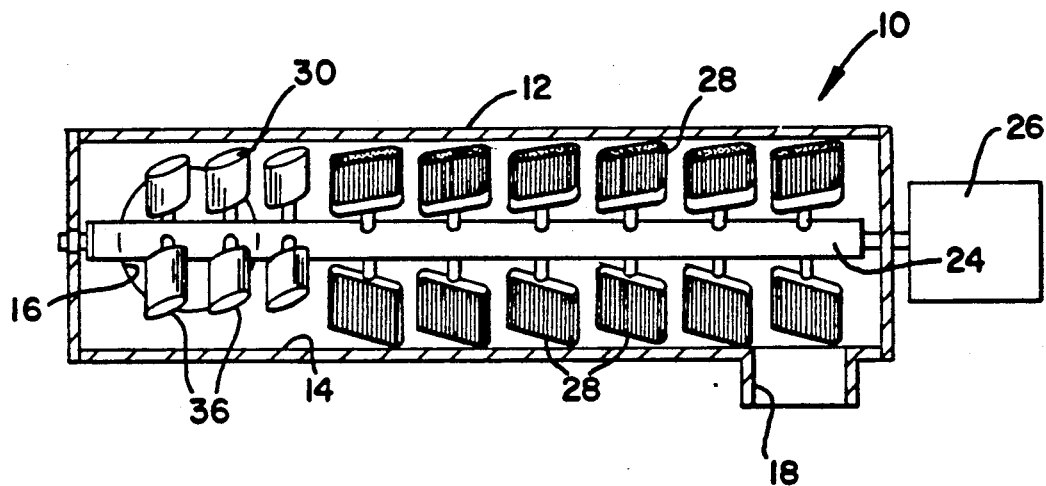
FIG. 1 is a cutaway, diagrammatic view illustrating an apparatus embodying the principles of the present invention.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

As will be hereinafter described in detail, the present invention contemplates an apparatus for making granular absorbent from cellulosic fibrous material. In particular, it is contemplated that the cellulosic fibrous material be provided in the form of relatively small pieces or fragments of paper or paper products, including recycled paper, waste paper, or other suitably low-cost feed stock. For example, recycled newsprint (which may be de-inked), corrugated, and magazines, are but a few of the suitable feed stock materials which can be employed. Sludge-like forms of recycled paper products which contain suitable quantities of fibrous material can be economically employed.

To the extent that such feed stock is not of a desirably fragmented nature, shredding of the feed stock, prior to use in the present apparatus, is preferred. One source of feed stock which has been successfully employed is available from manufacturers of machine-fed paper sheets. These paper sheets typically include perforations at the opposite margins thereof for engagement with drive sprockets such as in computer printers and the like. Large quantities of small paper punchouts or "dots" (sometimes referred to as shad) are generated attendant to formation of the so-called "tractor drive" perforations. These paper fragments are a suitable starting material for use in forming granular absorbent by use of the present apparatus.

In the present apparatus, the cellulosic fibrous feed stock can be of variable moisture content. It can be employed as a slurry, paste, or in a sludge-like form with water typically comprising 40%-90% by weight basis, of the dry feed stock. Testing has shown that elevating the temperature of the slurry to temperatures on the order of 150-200 degrees Fahrenheit can enhance and promote the agglomeration of the material to the desired generally spheroid, granular form.

While it is contemplated that the cellulosic fibrous material may comprise as much as 100% of the feed stock, the feed stock may also comprise other absorbent material, such as clay fines or the like. Such other absorbent material, or a density modulating additive, if desired, may be part of the feed or may be added separately before or during the agglomeration step. Additionally, clay fines can be added to the agglomerated cellulosic fibrous material after the fibrous material has been processed in the present apparatus.

As will be appreciated, subsequent to agitation and agglomeration in the present apparatus (which may be operated in either a batch or substantially continuous manner), drying is required to render the resultant granular material suitably absorbent. Drying equipment may include rotary kilns, fluidized bed dryers, microwave devices, and the like.

Figure 2:
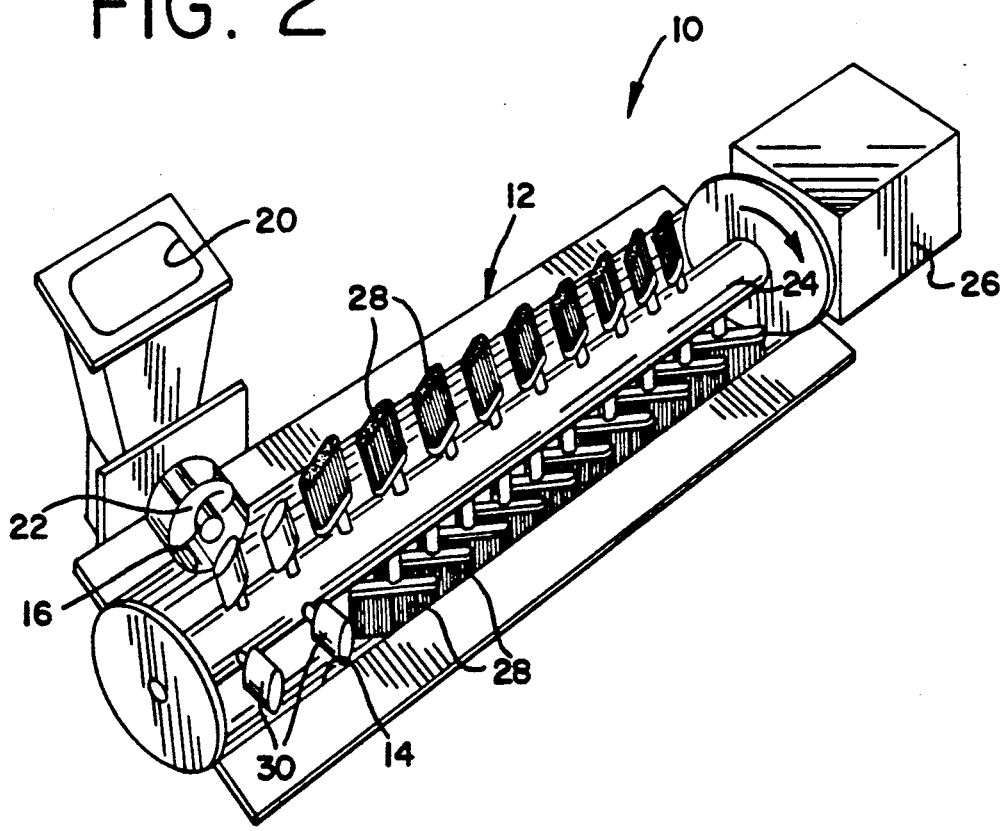
FIG. 2 is a perspective view of the apparatus shown in FIG. 1, with an upper portion of a housing thereof removed.

FIGS. 1 and 2, illustrate an apparatus 10 for making granular absorbent in accordance with the present invention. FIG. 1 illustrates a diagrammatic view of the present apparatus, while FIG. 2 illustrates a particular embodiment of the invention with the apparatus housing partially opened to illustrate its construction.

The present apparatus includes a housing 12 which defines an elongated, preferably cylindrical internal cavity 14, having a length-to-diameter ratio (L/D) greater than 1. Supply of feed stock to the apparatus is effected via an inlet 16 which communicates with the internal cavity 14. Discharge of the granular absorbent is provided via an outlet 18. The internal cavity 14 preferably is configured to have a length-to-diameter-ratio in the range of about 2 to about 10. An embodiment of the present invention in a pilot plant scale apparatus has an internal diameter on the order of about one foot.

In the illustrated embodiment, the outlet 18 is generally vertically oriented, while the inlet 16 extends generally horizontally from the internal cavity 14 of the apparatus housing. The cellulosic fibrous feed stock is directed into the inlet 16 from a feed port or opening 20. The feed stock is delivered to the internal cavity of the housing by a conveyor means such as a rotatably driven feed auger 22 positioned in the inlet 16.

In accordance with the present invention, a preferably multi-stage impeller bank is provided within the internal cavity 14 of the apparatus housing. An agitator shaft 24 extends within the internal cavity 14 for rotation about an axis defined thereby. A drive motor 26 is operatively connected with the agitator shaft 24 for effecting driven rotation of the shaft about the rotation axis. Rotational speeds on the order of about 550 revolutions per minute are effective for this purpose.

The impeller arrangement of apparatus 10 includes at least one, and preferably a plurality of arrays 28 of resiliently flexible bristles which are configured for cooperation with the surface of internal cavity 14 for effecting the desired agitation and mechanical working of the cellulosic fibrous feed stock, thereby effecting agglomeration of the fibrous material to form the desired pellet-like granular absorbent for discharge from outlet 18. In the embodiment of FIGS. 1 and 2, the bristle arrays 28 are provided in the form of brushes, which are mounted in generally opposing pairs along the length of shaft 24.

Figure 3:
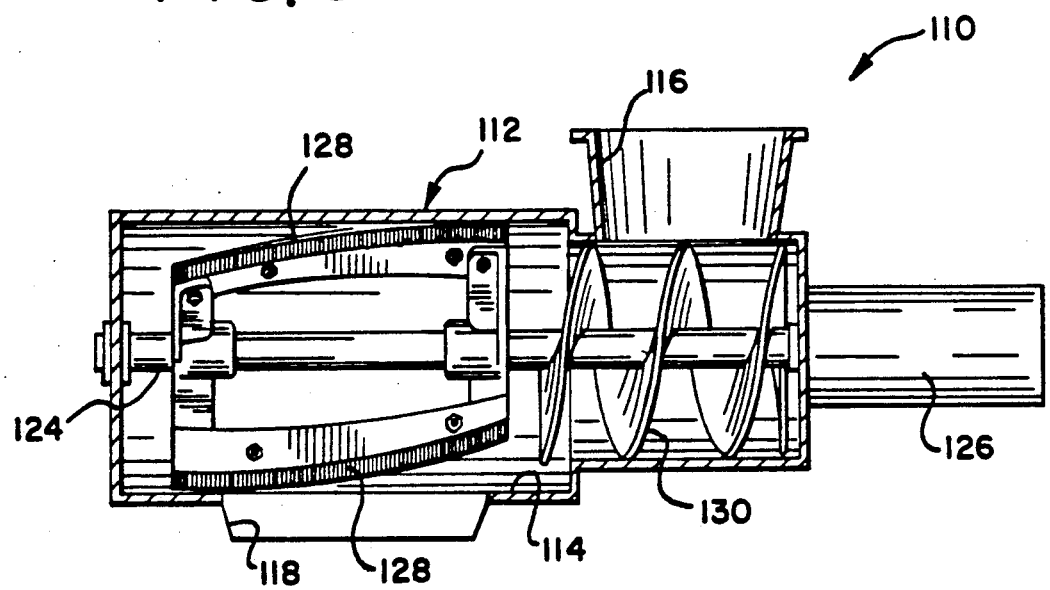
FIG. 3 is a cutaway, diagrammatic view of an alternate embodiment of an apparatus embodying the principles of the present invention.
Figure 4:
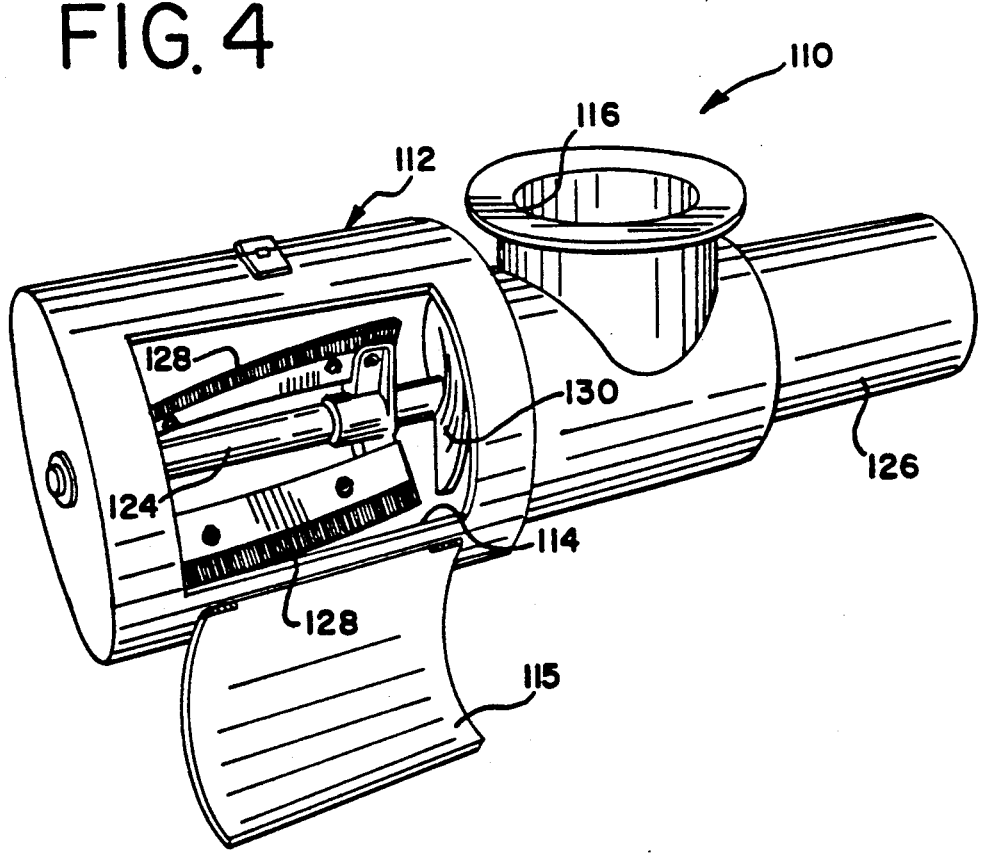
FIG. 4 is a perspective view of the present apparatus in accordance with the embodiment of FIG. 3.

As will be appreciated, the arrays of bristles 28 can be provided in a wide variety of configurations in keeping with the principles of the present invention. Depending upon the feed stock, its moisture content, and the degree of agitation to be achieved, at least some of the arrays of bristles may be disposed at an acute angle (such as 45°) relative to the longitudinal axis about which shaft 24 rotates. In contrast, at least some of the arrays of bristles can be disposed parallel to the rotational axis (i.e., with the individual bristle arrays substantially aligned with the centerline of shaft 24). For some applications, it can be desirable to orient at least some of the bristle arrays 28 substantially perpendicular to the rotational axis, i.e., extending generally transversely of the shaft 24. To facilitate orientation of the arrays of bristles as desired, they can be adjustably mounted on the shaft 24. A single, continuous, helical bristle array about shaft 24 can also be used, or a plurality of such arrays peripherally spaced from one another as illustrated in FIGS. 3 and 4.

It has been found that the resilient flexibility of the bristles of the arrays 28 provides the desired cooperation with the internal cavity of the housing 12 to effect substantially concurrent agitation, blending, and agglomeration of the cellulosic fibrous feed stock. In this regard, the bristles are preferably selected from the group consisting of metallic wire, natural hair, and synthetic fiber. However, other suitable filamentous materials can be employed as well to provide a flexible bristle array. In a current embodiment, bristles comprising a polyamide synthetic fiber such as Nylon ® and having a length of about 2.5 inches have been employed.

The bristle stiffness is selected so as not to tear the wetted starting material. Minimum bristle stiffness is not critical as long as a sweeping action of granules against the arcuate surface can be effected during processing.

Preferably, the bristles have a stiffness modulus such that the bristles can bear against the granules during processing with a force no more than about 1 pound per square inch (psi). More preferably, the bristles have a stiffness modulus such that the bristles can bear against the granules during processing with a force in the range of about 0.85 psi to about 0.3 psi.

Notably, the desired agglomeration and agitation action is best achieved when the free ends of the resilient bristles are spaced from the surface of internal cavity 14 of the apparatus housing. Specifically, the rotational path of the bristles is preferably spaced at a distance of up to about ½ inch from the arcuate, cylindrical surface of the internal cavity. It is preferred that the rotational axis of the shaft 24 and the arrays of bristles be positioned to sweep over and thus cooperate with substantially the entire internal surface of the cavity for effecting agglomeration. The spacing of the distal ends of the bristles in an array from the surface defining cavity 14 is also dependent to some degree on the feed rate of the material to be agglomerated. In general, the higher the feed rate, the greater can be the bristle spacing from the cavity surface.

While it is within the purview of the present invention to configure the surface of the internal cavity 14 to be substantially smooth to the touch, it is presently preferred that the surface be roughened or textured, either by machining or other surface treatment of the cavity, or by the disposition of a mesh or screen material along the surface of the cavity. In this regard, screen material configured to define openings having the size of about 35-80 mesh (U.S. Sieve Series) can be employed. A surface roughness on the order of $\epsilon = 0.00015$ to $0.008$ ft. is preferred, where $\epsilon$ is the surface roughness value according to Moody, Trans. Am Soc. Mech. Engrs. 66, 671-684 (1944). This type of internal surface has presently been found to provide the desired coaction with the resiliently flexible bristles for effecting agitation, blending, and pelletizing of the cellulosic fibrous feed stock.

In accordance with the illustrated embodiment, the agitator arrangement of the present apparatus is generally of a multi-stage configuration. Specifically, the arrays 28 of the resiliently flexible bristles preferably comprise the second agitator stage, with the primary or first stage of the arrangement disposed upstream of the arrays of bristles for conveying and advancing material from the inlet 16 to the arrays. To this end, a plurality of rigid, peripherally spaced paddle-like elements 30 serve as a conveyor means and are mounted on the shaft 24 and extend radially away from the rotational axis therefrom. The rigid elements 30 are configured and oriented to impart momentum to the feed stock received in the internal cavity from inlet 16, and to advance the material toward the rotating arrays of bristles 28. This preferred configuration permits these arrays of bristles to be positioned and configured to optimize the desired agitation and agglomeration, while the rigid elements 30, or like driving means, can be optimally configured for advancing the cellulosic fibrous material from the inlet 16, and through the internal cavity 14 for discharge at outlet 18.

FIGS. 3 and 4 illustrate an alternate embodiment of the present apparatus. Components of this embodiment corresponding in function to the components of the previously-described embodiment are indicated by like reference numerals in the one-hundred series.

As shown in FIGS. 3 and 4, apparatus 110 includes a housing 112 defining a cylindrical internal cavity 114. In this embodiment, the housing 112 includes a selectively openable access panel 115 to facilitate inspection of the interior of the housing. The housing further defines an inlet port 116 which communicates with the internal cavity for receiving cellulosic fibrous material, and an outlet port 118 for discharge of the formed granular absorbent.

A rotatable shaft 124 extends within the internal cavity of the housing for rotation about an axis preferably extending coincident with the centerline of the cylindrical internal cavity. A drive motor 126 is operatively connected with the shaft 124 for effecting driven rotation thereof.

In accordance with the present invention, a multistage blending and agitation arrangement is mounted on the shaft 124, and is configured for cooperation with the interior surface of internal cavity 114 for effecting the desired agitation and agglomeration of the cellulosic fibrous feed stock. In this embodiment, the agitation arrangement includes a plurality (such as three) of circumferentially spaced substantially continuous arrays 128 of bristles which extend away from the rotational axis of shaft 124. In this embodiment, each such bristle array 128 is arranged generally at an acute included angle with respect to the rotational axis of shaft 124. If desired, each array 128 may have a generally arcuate configuration. In the preferred form, the end of each array 128 positioned most closely to inlet 116 is the "leading" portion of each array attendant to rotation of shaft 124 relative to housing 112.

As discussed above, the bristle arrays 128 are preferably spaced from the interior cylindrical surface of internal cavity 114 to thereby define a gap up to about ½ inch between the free ends of the bristles and the interior surface. Again, the bristles themselves may comprise any of a variety of suitable filament-like members, including natural hair, synthetic fiber, and steel, brass, or other metallic wire. The gap size is dependent, in part, on the feed rate of the material to be granulated through the apparatus. In general, the greater the feed rate, the larger the gap.

In FIGS. 3 and 4, the bristle arrays 128 constitute the secondary stage of the device. In distinction from the previous embodiment, apparatus 110 includes a primary conveying stage which includes a rigid auger 130 positioned on shaft 124 for rotation therewith. By disposition of auger 130 upstream of the resilient bristles of arrays 128, cellulosic fibrous feed stock received through inlet 116 is conveyed and advanced from the inlet toward the bristles for subsequent discharge through outlet 118.

From the foregoing, it will be observed that numerous modifications and variations can be effected without departing from the true spirit and scope of the novel concept of the present invention. It is to be understood that the present disclosure is to be considered as an exemplification of the invention, and is not intended to limit the invention to the specific embodiments illustrated. The disclosure is intended to cover by the appended claims all such modifications as fall within the scope of the claims.

What is claimed is:

1. An apparatus suitable for making a granular absorbent from cellulosic fibrous material, said apparatus comprising:

a housing defining an internal cavity, an inlet communicating with said internal cavity for receiving said cellulosic fibrous material, and an outlet for discharge of said granular absorbent;

shaft means extending within said internal cavity of said housing for rotation about an axis, and at least a portion of the surface of said internal cavity having an arcuate configuration in a direction generally transverse to said axis;

means for rotatably driving said shaft means about said axis; and flexible impeller means mounted on said shaft means and extending away from said axis for cooperation with the arcuate surface of said internal cavity for effecting agitation and agglomeration of said cellulosic fibrous material, said flexible impeller means comprising at least one array of resiliently flexible bristles configured to contact said fibrous material upon shaft rotation to thereby convey said material along said cavity and effect formation of said granular absorbent.

2. An apparatus suitable for making granular absorbent in accordance with claim 1, wherein
said internal cavity of said housing is cylindrical.

3. An apparatus suitable for making granular absorbent in accordance with claim 1, wherein
the rotational path of said array of bristles of said agitator means is spaced from said arcuate surface of said internal cavity at a distance of up to about ½ inch.

4. An apparatus suitable for making granular absorbent in accordance with claim 1, wherein
said flexible impeller means comprises a plurality of resilient bristle arrays, at least some of said bristle arrays being disposed at an acute included angle relative to said axis about which said impeller means rotates.

5. An apparatus suitable for making granular absorbent in accordance with claim 1, wherein
said impeller means comprises a plurality of said arrays of resilient bristles, and wherein at least some of said arrays are disposed substantially parallel to said axis about which said impeller means rotates.

6. An apparatus suitable for making granular absorbent in accordance with claim 1, wherein
said bristles are selected from the group consisting of metallic wire, natural hair, and synthetic fiber.

7. An apparatus suitable for making granular absorbent in accordance with claim 1, wherein
a conveyor means is positioned upstream of said array of resilient bristles for advancing said fibrous material from said inlet of said housing toward said bristles.

8. An apparatus suitable for making granular absorbent in accordance with claim 7, wherein
said conveyor means comprises an auger means positioned on said shaft means for rotation therewith.

9. An apparatus suitable for making granular absorbent in accordance with claim 1, including
feed auger means positioned in said inlet of said housing for delivering said fibrous material to said internal cavity.

10. An apparatus suitable for making a granular absorbent from particulate cellulosic fibrous material, said apparatus comprising:
a housing defining an elongated internal cavity having a cylindrical surface, an inlet communicating with said internal cavity for receiving said cellulosic fibrous material, and an outlet for discharge of said granular absorbent;
shaft means extending within said internal cavity of said housing for rotation about an axis;
means for rotatably driving said shaft means about said axis;
flexible impeller means mounted on said shaft means and extending away from said axis for cooperation with the cylindrical surface of said internal cavity for effecting agitation and agglomeration of said cellulosic fibrous material, flexible impeller means comprising a plurality of arrays of resiliently flexible bristles configured to agitate said fibrous material to granulate said cellulosic fibrous material; and
conveyor means positioned upstream of said arrays of resilient bristles for conveying and advancing said fibrous material from said inlet of said housing toward said bristles.

11. An apparatus suitable for making granular absorbent in accordance with claim 10, including
feed auger means positioned in said inlet of said housing for delivering said fibrous material to said internal cavity at said conveyor means of said multistage agitator means.

12. An apparatus suitable for making granular absorbent in accordance with claim 10, wherein said conveyor means includes
auger means mounted to said shaft means for rotation therewith.

13. An apparatus suitable for making granular absorbent in accordance with claim 10, wherein
said conveyor means comprises a plurality of rigid paddle means mounted on said shaft means for conveying and advancing said fibrous material toward said flexible bristles.

14. An apparatus suitable for making granular absorbent in accordance with claim 10, wherein
the interior surface of said internal cavity is textured.

15. An apparatus suitable for making granular absorbent in accordance with claim 14, wherein
the textured interior surface of said internal cavity is a screen.

16. An apparatus suitable for making granular absorbent in accordance with claim 10, wherein
said arrays of bristles have a stiffness modulus such that the bristles bear against the granular absorbent during processing with a force in the range of about 0.85 to about 0.3 psi.

* * * * *